J. P. NEELY.
CULTIVATOR ATTACHMENT.
APPLICATION FILED OCT. 31, 1921.
1,424,669.
Patented Aug. 1, 1922.
2 SHEETS—SHEET 2.
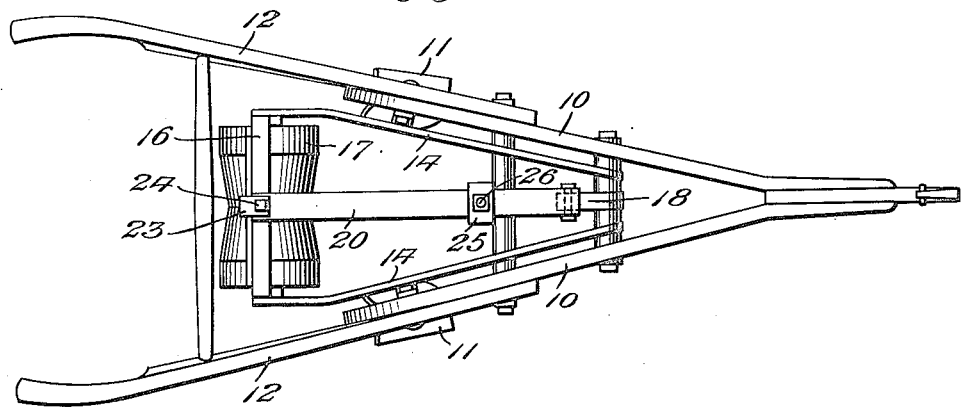
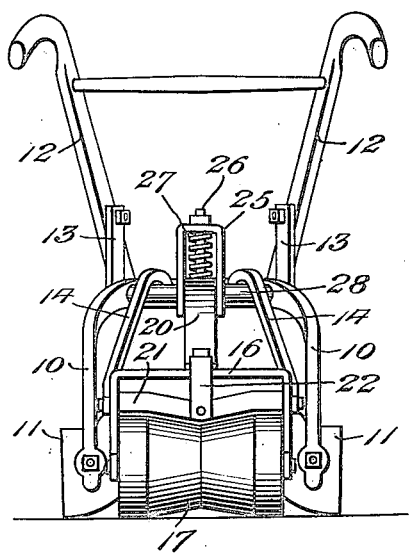
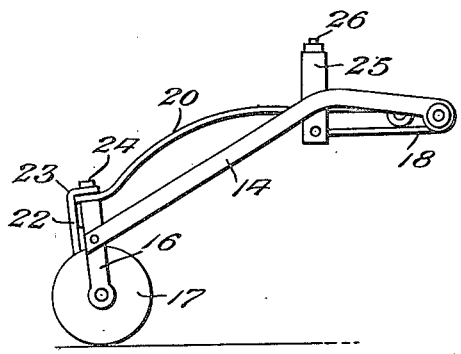
J. P. Neely Inventor
By Victor J. Evans Attorney

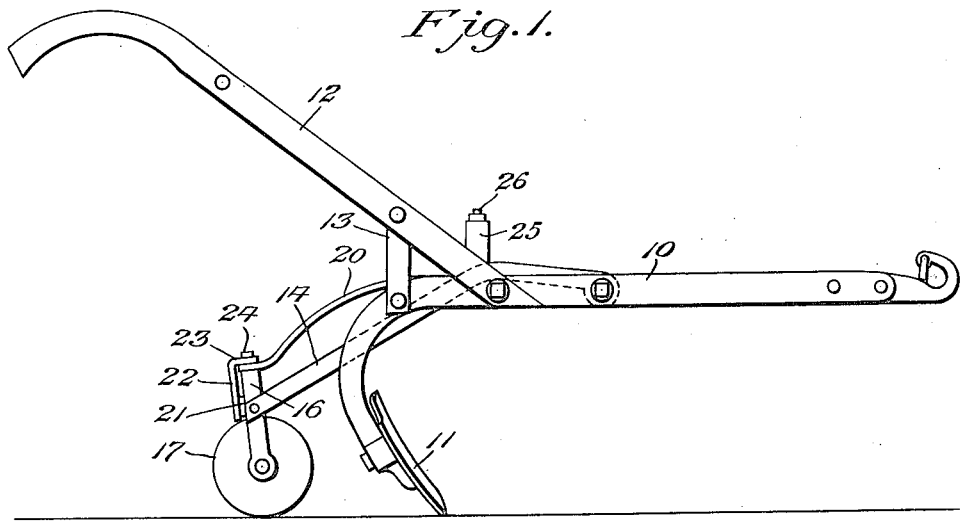
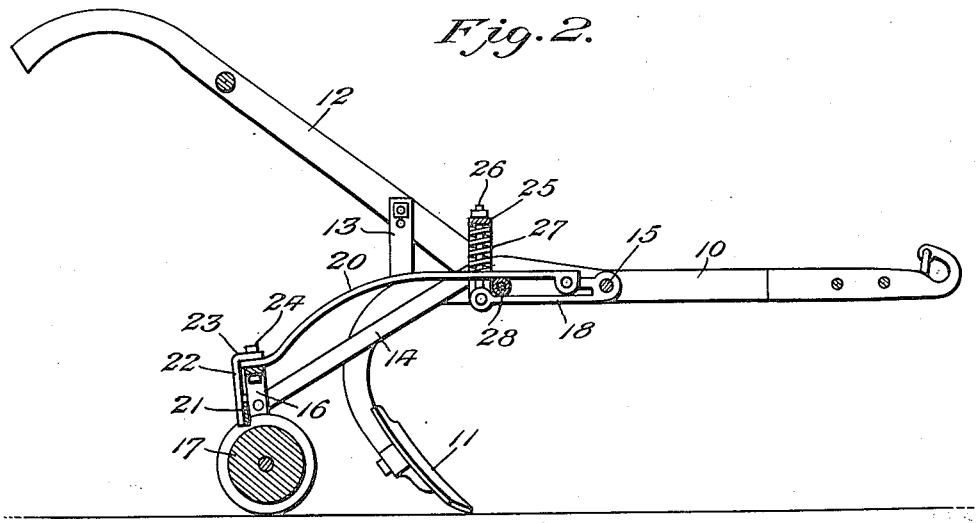

UNITED STATES PATENT OFFICE.

JESSEY P. NEELY, OF ADAMS, TENNESSEE.

CULTIVATOR ATTACHMENT.

1,424,669.  Specification of Letters Patent.  Patented Aug. 1, 1922.

Application filed October 31, 1921. Serial No. 511,865.

*To all whom it may concern:*

Be it known that I, JESSEY P. NEELY, a citizen of the United States, residing at Adams, in the county of Robertson and State of Tennessee, have invented new and useful Improvements in Cultivator Attachments, of which the following is a specification.

This invention comprehends the provision of a cultivator attachment in the nature of a drum for packing the hill or ridge made by the cultivator, the drum being yieldably mounted upon the cultivator and disposed at the rear of the shovels thereof.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views and wherein:—

Figure 1—is a side elevation of the cultivator equipped with the attachment forming the subject matter of the invention.

Figure 2—is a view similar to Figure 1, partly in section.

Figure 3—is a top plan view.

Figure 4—is a rear elevation.

Figure 5—is a detail view of the auxiliary frame and yoke.

Referring to the drawings in detail, the cultivator frame includes the divergently disposed members 10 which have their rear ends curved downwardly in the usual well-known manner, and have secured thereto the shovels 11. The handles 12 for the cultivator are suitably secured to the frame and braced by the elements 13.

The attachment forming the subject matter of the present invention comprises an auxiliary frame including divergently disposed members 14 which have their corresponding forward extremities pivoted on a transverse rod 15 interposed between the members of the cultivator frame. The members 14 of the auxiliary frame project an appreciable distance beyond the rear end of the cultivator frame and support a yoke 16 in which a drum or roller tapered toward its center is journaled, the drum or roller being indicated at 17. Projecting rearwardly from the transverse rod 15 is a stationary arm 18 upon which is pivoted one end of a lever 20, the lever having its opposite end secured to the yoke 16. Supported by the yoke is a scraper blade 21 to maintain the roller or drum free from dirt or the like, the blade extending across the roller as shown. The blade includes a shank 22 which has an offset extremity 23 reposing upon the adjacent end of the lever 20, and a single fastening element 24 is utilized to hold these parts operatively associated. Supported by the stationary arm 18 is an inverted U-shaped member 25 between the parallel limbs of which is arranged a bolt 26, and surrounding this bolt is a coiled spring 27. One end of the spring bears against the U-shaped member, and the opposite end of the spring bears against the lever depressing the latter to hold the roller in operative relation to the ground, and at the same time allowing the roller to yield under certain conditions.

The cultivator attachment is primarily intended for use in cultivating tobacco, although its general application is contemplated by the claims. As the cultivator is moved over the surface of the ground, the shovels 11 form the hill or ridge in a well-known manner, and as the roller or drum is arranged directly behind the shovels the hill or ridge is packed so as to retain the moisture necessary to proper cultivation. The attachment is not only simple in construction, but is designed so that it can be quickly and easily associated with a double shovel cultivator in quick order.

Arranged transversely of the member 10 of the cultivator frame is a rod 28 which serves to limit the downward movement of the auxiliary frame and lever 20.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

1. The combination with a cultivator frame, of an auxiliary frame pivoted upon the first mentioned frame, a yoke carried by the auxiliary frame, a roller journaled in said yoke, a lever pivoted at one end and its opposite end secured to said yoke, a yieldable means exerting a downward pressure on said lever for the purpose specified, and means for limiting the movement of the auxiliary frame and said lever under the influence of the yieldable means.

2. The combination with a cultivator frame, of an auxiliary frame mounted for pivotal movement, a yoke carried by the auxiliary frame, a roller journaled in said yoke, a stationary arm, a lever having one end pivoted on said arm and its opposite end secured to said yoke, a member carried by said arm, a bolt supported by said member and passed through said lever, a coiled spring surrounding said bolt and exerting a downward pressure upon said lever, means for limiting the movement of said lever and yoke under the influence of said spring.

3. The combination with a cultivator frame, of a stationary member supported by the frame, a lever projecting rearwardly from the frame and pivoted on said member, a ground engaging member supported by the rear end of said lever for the purpose specified, an inverted U-shaped member supported by the stationary member, and a yieldable element associated with the said U-shaped member and arranged above and directly contacting said lever to exert a downward pressure upon the latter.

In testimony whereof I affix my signature.

J. P. NEELY.